2 Sheets—Sheet 1.

S. D. LOCKE.

WIRE AND PIPE SUPPORTING AND SNOW REMOVING APPARATUS.

No. 10,980. Reissued Jan. 29, 1889.

WITNESSES:

Merritt Gorton

W. G. Ridall

INVENTOR,

Sylvanus D. Locke

E. B. Stocking

Attorney.

N. PETERS, Photo-Lithographer, Washington, D. C.

S. D. LOCKE.

WIRE AND PIPE SUPPORTING AND SNOW REMOVING APPARATUS.

No. 10,980. Reissued Jan. 29, 1889.

Witnesses:

Wm. H. Scott

W. S. Duvall.

Inventor

Sylvanus D. Locke

E. B. Stocking

Atty.

N. PETERS, Photo-Lithographer, Washington, D. C.

UNITED STATES PATENT OFFICE.

SYLVANUS D. LOCKE, OF HOOSICK FALLS, NEW YORK.

WIRE AND PIPE SUPPORTING AND SNOW-REMOVING APPARATUS.

SPECIFICATION forming part of Reissued Letters Patent No. 10,980, dated January 29, 1889.

Original No. 355,185, dated December 28, 1886. Application for reissue filed November 14, 1888. Serial No. 290,861.

*To all whom it may concern:*

Be it known that I, SYLVANUS D. LOCKE, of Hoosick Falls, in the county of Rensselaer and State of New York, have invented certain new and useful Improvements in Wire and Pipe Supporting and Snow-Removing Apparatus, of which the following is a specification.

My invention relates to the employment of steam to melt the snow in the streets of cities, that it may as water be conducted into the sewers; and the objects of my improvements are, first, to reduce the cost of removing the snow from the streets; second, to provide a simple method of melting the snow without interfering with the street-traffic; third, to afford throughout the entire line of the street ready and effective means for melting the snow therein without carting or hauling it; and, fourth, to secure not only a permanent as well as an effective means, always at hand, for melting the snow, and for conducting it when melted from all points in the line of the street into the sewers, but a permanent conduit for pipes and wires, always accessible without disturbing the pavement or traffic of the street.

That others skilled in the art may make and use my invention, I will proceed to describe its construction and operation, reference being had to the accompanying drawings, making a part of this specification, in which—

Figure 1:
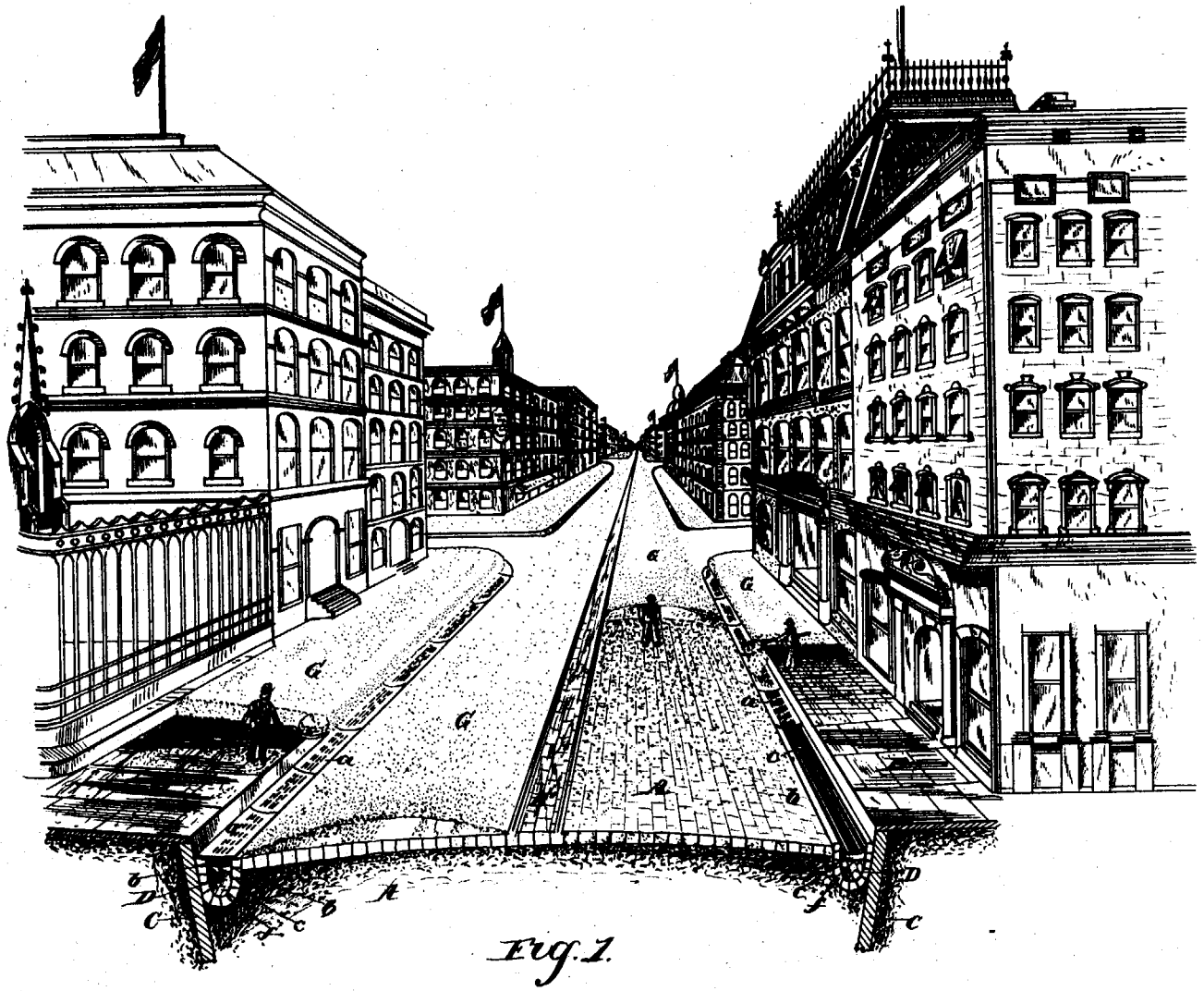
Figure 2:
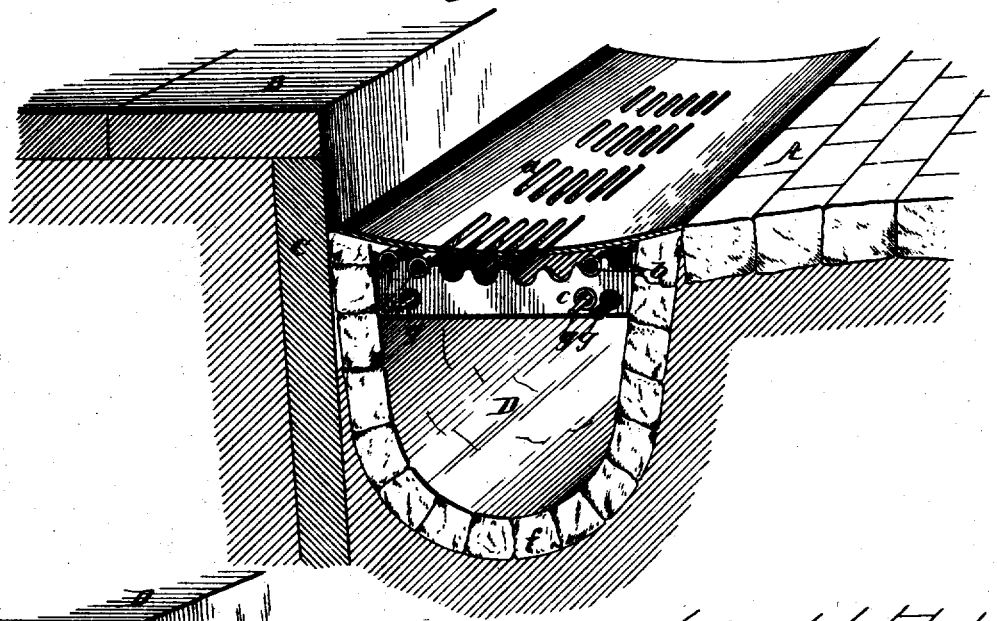
Figure 3:
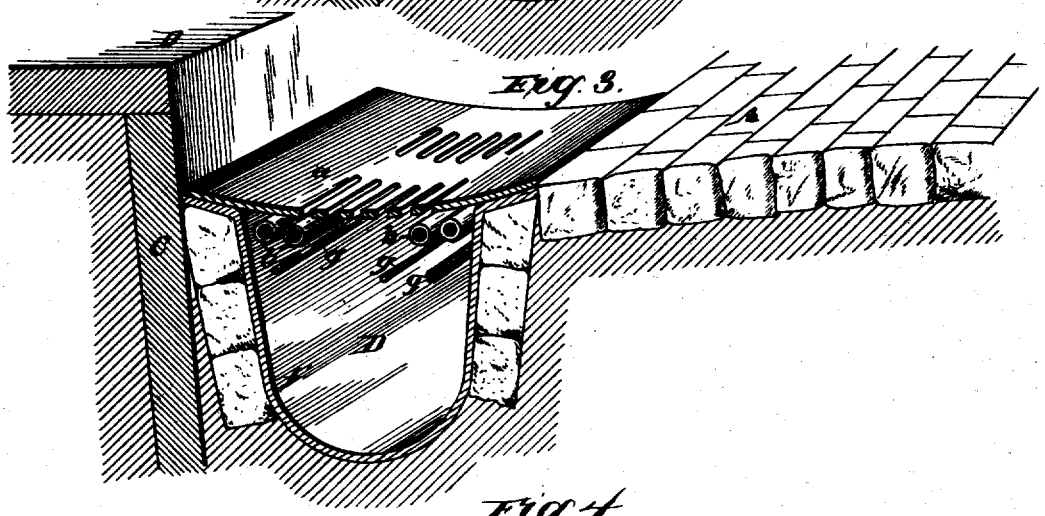
Figure 4:
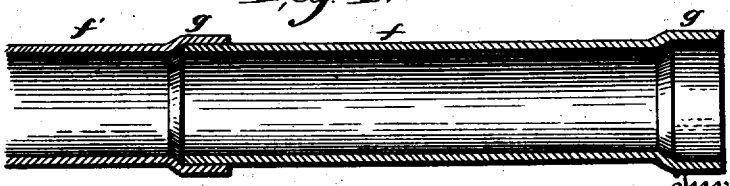

Figure 1 is a perspective view of a city street, with a cross-section of the same in the foreground, and showing my improvements applied thereto. Fig. 2 is a perspective view, partly in cross-section, of one side of a portion of the street, showing more in detail the construction and application of my improvements. Fig. 3 is a view similar to Fig. 2, showing a modification of the gutter; and Fig. 4 is a longitudinal horizontal section, looking down, of the metallic gutter shown in Fig. 3.

In the drawings, A represents the surface or pavement, B the sidewalk, and C the curbstone—the common ordinary features of a street. Under the open or surface gutter I construct on either side of the street, preferably on both sides, a closed or covered one, (shown at D in the drawings.) This blind or sub gutter may be constructed of stone, *f*, Figs. 1 and 2, and of any desired form and size. Preferably I construct it of iron cast in sections, *f'*, Figs. 3 and 4, and of the general form that appears in the drawings. Ordinarily it is best that this sub-gutter should be from one to two feet deep, and so rounded or egg-shaped at the bottom as to offer the least obstruction to the flow of the melted snow or water. If constructed of cast-metal sections properly united, as shown in Fig. 4, this obstruction is reduced to the minimum. I prefer to unite them as shown in Fig. 4. Spanning the upper part of this sub-gutter, at stated intervals, are cross-bars or racks *c*, and the top of the gutter is capped by a metallic grating, *a*, that is made to take the form it is desired the surface of the street should have, and is sufficiently open to allow the melted snow and water on the street to pass through it from the surface-gutter into the gutter below. This grate, covering the sub-gutter, should be made in sections, as shown, placed end to end, and held in place by the curbstone on one side and the pavement on the other, or by having a part of it projecting down so as to shoulder against the inner faces of the gutter. Being made in sections, this covering is readily removed, and the whole sub-gutter can easily and quickly be thrown open for cleaning or repairing the same, or the removal, repair, or replacement of the pipes therein. The sub-gutters connect with the sewers in the ordinary way, and underneath and in close proximity to this covering or grate I run one or more steam-pipes, *b*. These pipes rest and are supported on the racks *c*.

I prefer to use, where much snow is to be melted, as in cities where the snowfall is heavy, several pipes ranged parallel with each other immediately under the grate or covering gutter-plate; but where the steam is conducted beyond the limits of a block, or where the amount of snowfall is light, the main steam-pipe may be advantageously used either alone or auxiliary to the service-pipes or the smaller pipes shown.

By the use of this invention it is apparent that the snow in the gutter will melt as fast as it falls, and that the snow on the walks and in the roadway of the street will only need to be shoveled or scraped each way into the gutters to be melted. No hauling or carting of it will be required.

It is evident that the steam produced by plants established for other purposes—as for the supplying of heat, light, or power in cities—may be utilized either directly or indirectly for the purpose herein specified. It is also evident that this method of melting the snow in the streets of cities preserves the surface of the streets unimpaired, and therefore does not interfere in the least with the traffic thereon.

I am aware that it has been publicly suggested that the snow in the streets of cities might be removed in two ways: first, by injecting steam directly into it from service hand-pipes, and, second, by constructing somewhere in the street boxes with steam-coils in the bottom, into which the snow might be thrown to be melted. I am also aware that in London pits connecting with the sewer are constrtucted with steam-coils in the bottom, to which pits the snow is hauled to be melted. All of these methods are objectionable, however, on the score of economy, and because they obstruct or interfere with the traffic in the street, besides requiring the snow to be carted.

This deep closed gutter D is especially adapted, with its removable cover *a* and its cross-bars or racks *c*, to receive the electric telephone and telegraph wires that are, greatly to the annoyance and inconvenience of the public, generally carried on poles. Other wires and pipes may also be safely carried in this gutter. These wires *g* should be carried on the racks *c*, the latter being made of any desired form for carrying them either in single wires or grouped in cables.

What I claim is—

1. A sub-gutter provided with devices for supporting conductors and with a cover having an inclined portion and a perforated portion, whereby said cover serves as a surface-gutter, substantially as specified.

2. In combination with a surface-gutter having lateral inclined imperforate portions and a perforated portion, a sub-gutter provided with means for supporting conductors, substantially as specified.

3. A sub-gutter provided with wire and pipe supporting devices and with a cover formed as a surface-gutter, substantially as specified.

4. The combination of a surface-gutter and a sub-gutter provided with removable racks for supporting pipes, cables, and wires, substantially as specified.

5. In a city street, for the purpose of melting the snow therein, a sub-gutter underneath the roadway having a perforated cover, in combination with pipes in the top thereof for melting the snow which is conducted in the bottom of the same into the sewers, substantially as described.

6. In a city street, a sub-gutter with a perforated cover having steam apparatus for melting the snow in the street, in combination with racks for supporting said steam apparatus and other pipes or wires, substantially as described.

SYLVANUS D. LOCKE.

Witnesses:
E. B. STOCKING,
H. SUTHERLAND.